July 15, 1969     G. G. VEST     3,455,495

WELDING APPARATUS CARRIAGE

Filed Sept. 15, 1967     4 Sheets-Sheet 1

INVENTOR.
GAYLORD G. VEST

BY Bosworth Sessions
Herrstrom & Cain

ATTORNEYS

July 15, 1969  G. G. VEST  3,455,495
WELDING APPARATUS CARRIAGE
Filed Sept. 15, 1967  4 Sheets-Sheet 2

INVENTOR.
GAYLORD G. VEST
BY Bosworth, Sessions
Herrstrom & Cain
ATTORNEYS

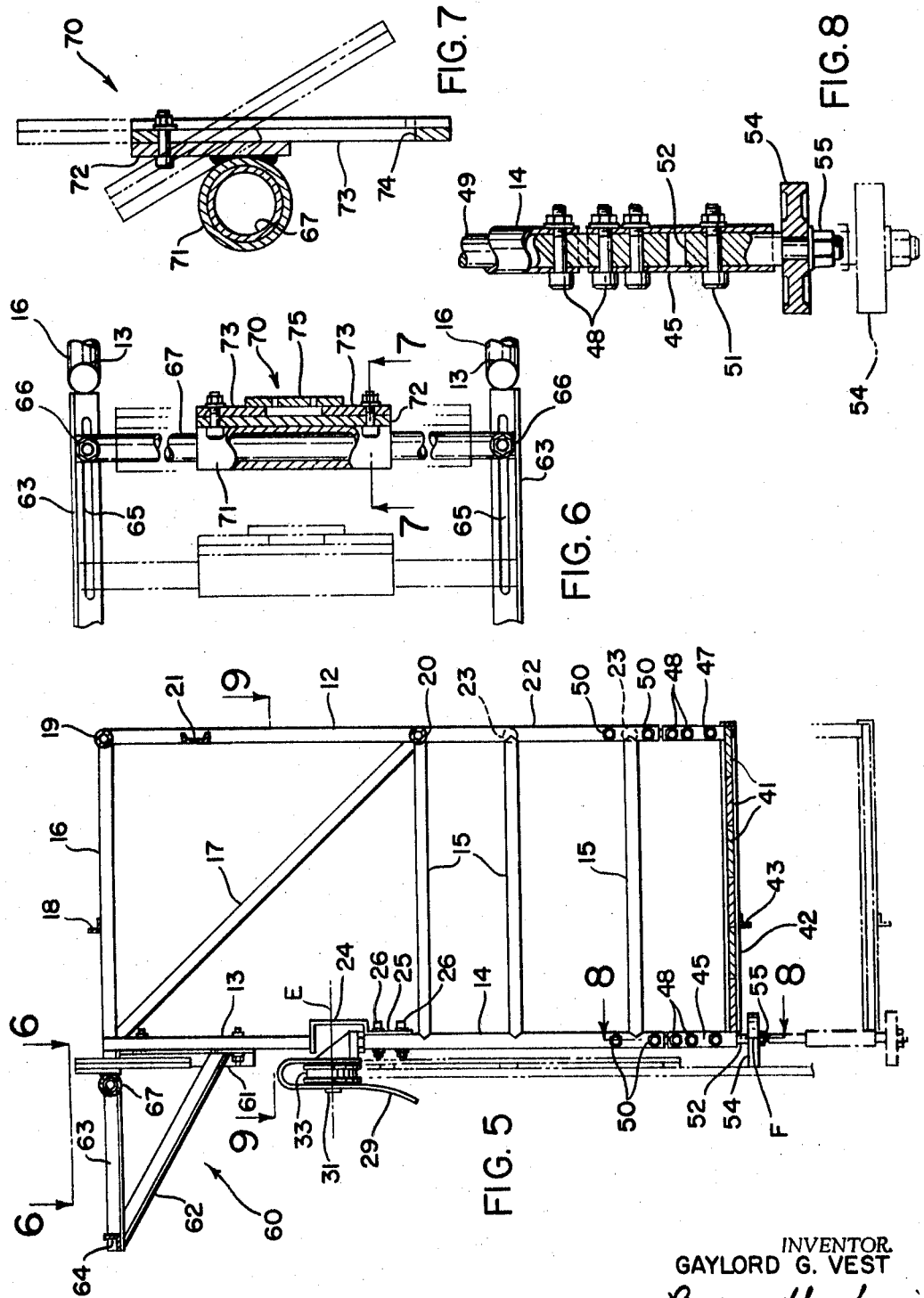

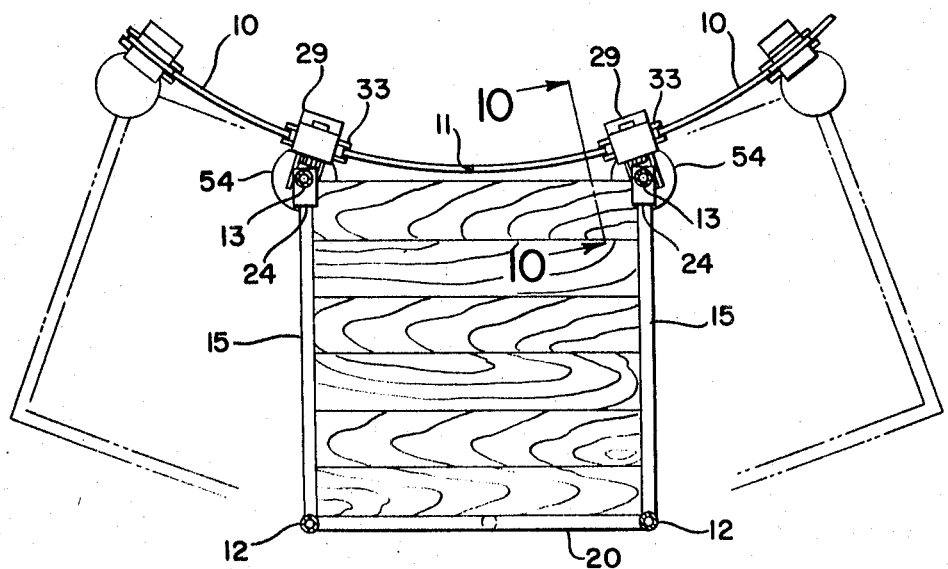
FIG. 9
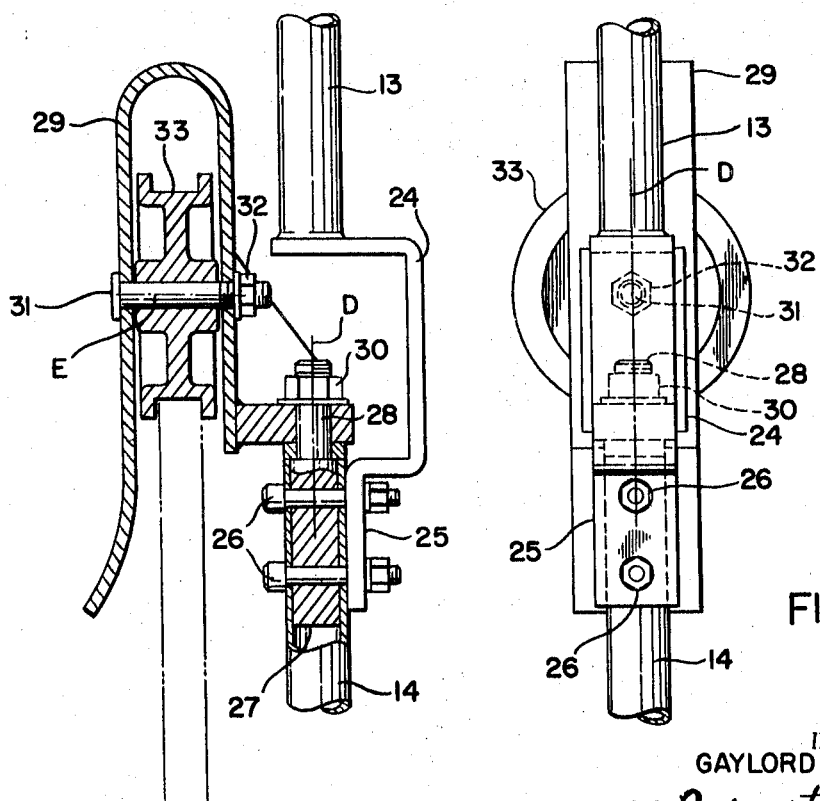
FIG. 10
FIG. 11
INVENTOR.
GAYLORD G. VEST
BY Borworth Sessions
Herrstrom + Cain
ATTORNEYS United States Patent Office 3,455,495
Patented July 15, 1969

3,455,495
WELDING APPARATUS CARRIAGE
Gaylord G. Vest, Parma Heights, Ohio, assignor to Arthur G. McKee & Company, Cleveland, Ohio, a corporation of Delaware
Filed Sept. 15, 1967, Ser. No. 667,984
Int. Cl. B23k 37/02, 9/12
U.S. Cl. 228—45                                    9 Claims

ABSTRACT OF THE DISCLOSURE

A mobile carriage for supporting vertical-seam welding tools and the like on an upright wall. The apparatus travels horizontally along the wall from one operating position to another and provides a platform and if desired a shelter for the tool operator. The track for the tool is adjustably and pivotally mounted so that it may be positioned for proper location adjacent the seam and be swung away from the wall section during travel of the carriage between operating positions.

BACKGROUND OF THE INVENTION

This invention relates to welding and especially to the continuous and automatic welding of long vertical seams in upright walls. More particularly the invention relates to a tool carriage or fixture adapted to carry the tool during and between welding operations and also to provide a platform for one or more welding tool operators.

The welding of vertical seams during the field erection of large tanks and vessels is generally a time-consuming operation requiring the handling of heavy welding tools and bulky accessory equipment by a skilled operator under all types of weather conditions. Accordingly, it is generally desirable to use automatic seam welding equipment, not only because of the costs involved but also to obtain uniform quality of welds to thereby provide stronger seams.

Some automatic seam welding tools currently available weld while traveling automatically along a seam at a uniform speed corresponding to the rate at which the tool welds each seam increment. For example the tool may be automatically propelled along a track aligned parallel to and adjacent the seam by means of a rack and pinion or the like. The track is secured to the wall section adjacent a seam by means of permanent magnets. The speed of the motor which drives the tool along the track may be regulated for example by a photoelectric system so that the travel of the tool along the seam is consistent with the weld deposition rate.

This equipment, however, is necessarily heavy and cumbersome and thus difficult to lift and carry from one seam to the next between welding operations. Also in large installations such as cylindrical fuel storage tanks it is necessary to build elaborate scaffolding to support the operator when the upper plates are being welded in place. Moreover, the scaffolding must extend all around the circumference of the tank and be raised to a new level each time a new row of plates is to be welded.

The present invention substantially reduces the difficulties indicated above and affords other features and advantages not obtainable from the prior art.

SUMMARY OF THE INVENTION

It is among the objects of the invention to support the track for an automatic seam welding tool while it is welding an upright seam, and to move it along an upright wall section to another location where another seam is to be welded, without manually lifting or carrying the tool.

Another object is to provide a convenient and safe enclosure which can support an operator while the welding tool is in use.

According to a preferred form of the invention, the foregoing and other objects and advantages are accomplished by means of an apparatus for supporting automatic seam welding tools of the type described which comprises a frame adapted to be supported on and located adjacent one or more upright wall sections to be welded at vertical seams. Mounted on the frame is a roller means including rollers that engage the wall sections and support the frame for lateral travel along the wall from one seam to another between welding operations. Pivotally connected to the frame for movement about a horizontal axis and in a plane normal to the wall surface is a bracket from which the track for the welding tool may be suspended. The pivot axis of the tool bracket is adjustably located on the frame so that the track can be accurately located in operating position adjacent the seam to be welded, preferably within convenient reach of an operator standing on a platform at the bottom of the frame.

In the preferred form the frame is supported in an upright position from the wall section by a pair of flanged rollers rotatable about spaced horizontal axes and which bear on and roll along the top edge of the wall sections. The roller housings which carry the roller shafts are preferably connected to the frame to swivel about vertical axes so that the apparatus can accommodate the curvature of cylindrical and oval shaped tank shells. Cooperating with the horizontal-axis rollers and located near the bottom of the frame is a pair of flat rollers rotatable about spaced vertical axes. These rollers travel along the surface of the wall sections to support the frame laterally from the wall to prevent turning of the frame relative to the wall about its top edge. The frame is thus supported in cantilever fashion from the wall, while being capable of being rolled along the wall.

Other objects, uses and advantages of the invention will appear from the following detailed description and drawings which illustrate one embodiment of the invention.

BRIEF DESCRIPTION OF THE DRAWINGS

FIGURE 5 is a cross-sectional view on an enlarged scale of the tool supporting carriage taken on the line 5—5 of FIGURE 1;

FIGURE 6 is a fragmentary plan view on an enlarged scale taken on the line 6—6 of FIGURE 5, with parts broken away and shown in section;

FIGURE 7 is a fragmentary sectional view on an enlarged scale taken on the line 7—7 of FIGURE 6;

FIGURE 8 is a fragmentary sectional view on an enlarged scale taken on the line 8—8 of FIGURE 5;

FIGURE 9 is a horizontal sectional view taken on the line 9—9 of FIGURE 5;

FIGURE 10 is a fragmentary sectional view on an enlarged scale taken on the line 10—10 of FIGURE 9; and FIGURE 11 is a fragmentary elevational view on an enlarged scale showing the swivel joint for the horizontal axis roller of FIGURE 10.

DESCRIPTION OF THE PREFERRED EMBODIMENTS

Figure 1:
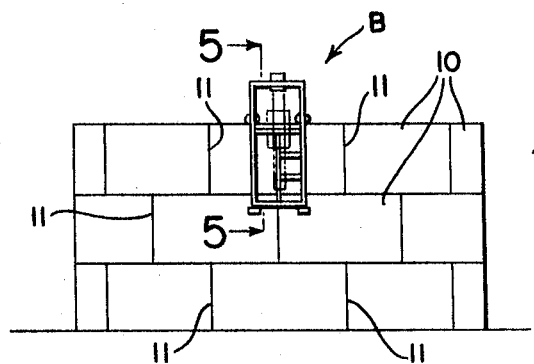
FIGURE 1 is an elevational view showing a welding tool carriage embodying the invention, located in operating position on a cylindrical tank shell comprising generally rectangular, curved steel wall sections.
Figure 2:
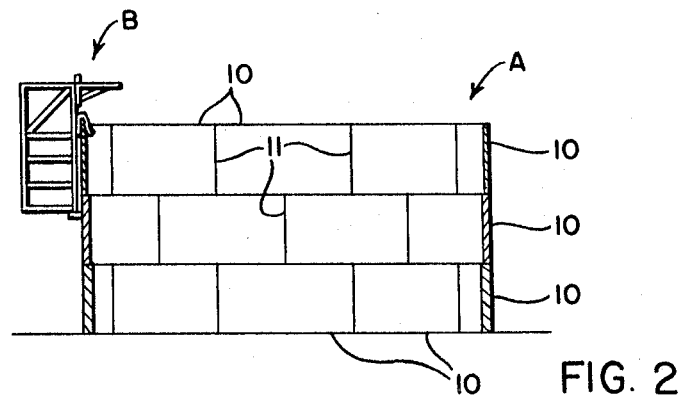
FIGURE 2 is a cross-sectional view showing the cylindrical tank shell and welding tool carriage of FIGURE 1.

Referring more particularly to the drawings, FIGURES 1 and 2 show a cylindrical fuel storage tank A being constructed, in the field, of curved rectangular sections 10 which are placed together edge to edge around the circumference of the tank and which are stacked edge to edge in superposed rows. The plates are temporarily held together in proper positions for welding by suitable conventional means, such as tack welding, or known clamping means. The seams formed at the abutting vertical and horizontal edges of the tank sections are welded together to make the tank liquid tight.

The horizontal seams may be welded in known manner by known means, as manually or by horizontal seam welding apparatus. The vertical seams between adjacent plates are welded by use of the below described apparatus; in FIGURES 1 and 2, the vertical seams of the top row of sections are being welded, those below having already been so welded.

Mounted on the top row of the sections 10 is a mobile tool carriage B embodying the invention. As best shown in FIGURE 2 the carriage is cantilevered on the outer wall of the tank A and is adapted for horizontal travel around the wall of the tank from one vertical seam 11 to the next. Supported by the carriage B is the track C (FIGURE 4) for an automatic vertical-seam welding tool (not shown); such as the "Vertomatic" welding machine made and sold by Arcos Corporation, 1500 S. 50th St., Philadelphia, Pa., in which the track is secured by magnetic means to the wall section adjacent the seam to be welded.

The apparatus B comprises a welded rectangular frame formed principally of tubular members or pipes and having an open, unobstructed front, reinforced sides and a reinforced back. The frame includes rear corner posts 12, upper front corner posts 13 and lower front corner posts 14, all connected by tubular cross members to form a box-shaped skeletal structure.

The rear corner posts 12 are connected to the lower front corner posts 14 by horizontal cross members 15 and to the upper front corner posts 13 by horizontal cross members 16 and diagonal members 17. The cross members 16 are connected together intermediate their ends by a cross member 18.

The rear corner posts 12 are connected by horizontal cross members 19 and 20 and a channel beam 21. Welded to the cross member 20 intermediate its ends and extending downwardly therefrom is a vertical post 22. Extending between the post 22 and one of the rear corner posts 12 are short horizontal cross members 23. Post 22, cross member 20, and corner post 12 in part define a doorway that permits access by an operator to the interior of the carriage B.

Each upper front corner post 13 is connected to its corresponding lower front corner post 14 by a member 24 (FIGURES 10 and 11). Each connecting member 24 is generally C-shaped and has a downwardly extending lower end 25 which is fastened to the side of the corresponding lower front corner post 14 by bolts 26. The opposite end of the brace 24 is welded to the corresponding axially aligned upper front corner post 13.

Recessed within the upper end of each lower front corner post 14 is a rod 27 secured by bolts 26 that extend through transverse openings in the rod 27. Each rod 27 has a pin 28 extending above its respective lower corner post 14, that supports a roller-supporting member 29 for pivotal movement about an upright axis D, member 29 being held in place by a nut 30 on the threaded end of the pin 28.

Each member 29 carries a roller axle 31 secured also by a nut 32 on which axle a flanged roller 33 is journaled for rotation about a lateral pivotally mounted axis E. Each roller 33 is adapted to bear downwardly against and roll along the top edge of wall sections 10 to be welded together. Each roller 33 is also offset from axis D sufficiently to enable the posts 13 and 14 of the frame to clear a wall section the edge of which is received between the flanges of roller 33. The pivotal mounting of the roller 33 enable it to accommodate curvature of the wall section on which the carriage is supported as best illustrated in broken lines in FIGURE 9. Each member 29 extends far enough below its respective roller 33 on the side of the wall opposite the carriage B to prevent the carriage from falling off the wall in the event the rollers 33 accidentally ride off of the edge of the wall section.

Adjustably connected to the bottom of the corner posts 12 and 14 and to the bottom of the vertical post 22 is a platform assembly, broadly indicated by numeral 40. Assembly 40 includes wooden floor boards 41 with their opposite ends supported by angle bars 42 connected together intermediate their ends by an angle bar 43 located below the floor boards 41. Another angle bar 44 extends between the rearward end of the bars 42.

Extending upwardly from the angle bars 42 and 44 are front corner legs 45, rear corner legs 46 and a rear intermediate leg 47. The legs 45, 46 and 47 are tubular and each has fastened therein by bolts 48, an extension rod 49 (FIGURE 8) which extends upwardly into the tubular posts 12, 14 and 22, respectively. The upper ends of the rods 49 are fastened in the posts 12, 14 and 22 by bolts 50. The rods 49 have a number of transverse openings spaced along their length for the bolts 50 and accordingly the position of the platform assembly 40 can be readily adjusted to fit the circumstances as illustrated in broken lines in FIGURES 5 and 8. Generally the adjustment depends on the length of the welding tool track C being used and the length of the seam to be welded.

Fastened in the lower end of each front leg 45 (FIGURE 8) by a bolt 51 is a rod 52 having a pin 53 on its lower end which extends below the platform. The pin 53 serves as an axle for supporting a roller 54 for rotation about an upright axis F, preferably normal to a plane containing axis E. Each roller 54 is held in place on the pin by a bolt 55.

The rollers 54 laterally bear against and roll along the surface of the rectangular wall section to be welded, thus cooperating with the flanged rollers 33 to support the carriage for travel between its various operating positions.

Figure 4:
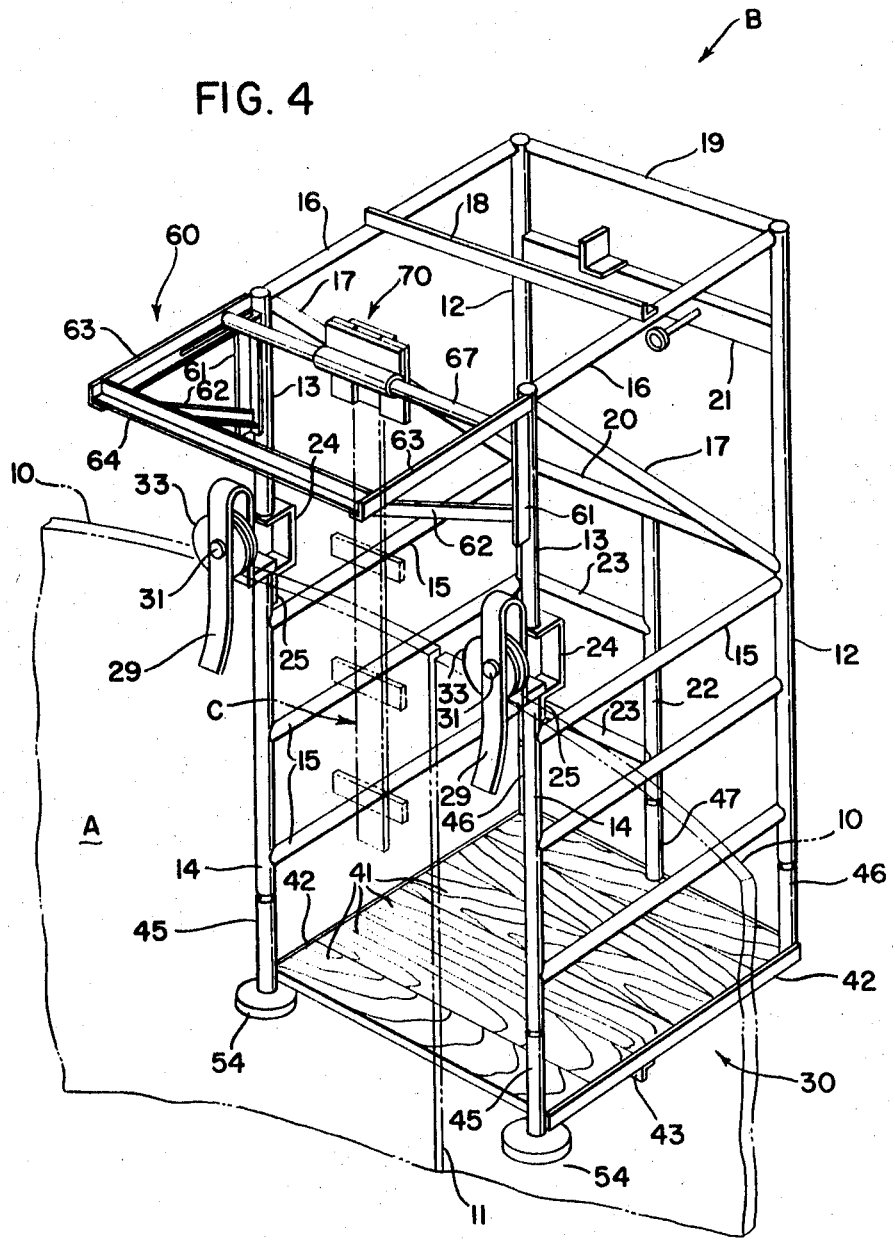
FIGURE 4 is a perspective view on an enlarged scale showing the welding tool carriage supported on wall sections of a cylindrical storage tank; indicated in broken lines.

Bolted to the top of the upper front corner posts 13 is a canopy assembly broadly indicated by the numeral 60. The assembly 60 generally comprises angle bars welded together to form a skeletal frame (FIGURES 4 and 5). The frame includes vertical posts 61 bolted to the upper corner post 13, diagonal braces 62 and horizontal braces 63 welded together to form two cantilever supports tied together by a horizontal cross member 64.

The braces 63 have slots 65 formed therein (FIGURE 6) which receive bolts 66 that secure a tubular cross member 67 extending between the braces 63. The slots 65 permit forward and rearward adjustment of the cross member 67 for a purpose to be described below.

Slidably and pivotally received on the cross member 67 (FIGURES 6 and 7) is a tool-supporting bracket broad-indicated by numeral 70. The bracket 70 comprises a tubular sleeve 71 received on the cross member 67, a plate 72 welded to the sleeve 71 and spaced side plates 73 bolted to plate 72. Plates 73 have vertical slots 74 permitting generally vertical adjustment of plates 73 relative to plate 72. Plates 73 are both welded to a rear plate 75 which has openings for fastening the welding tool track C to the bracket 70. FIGURES 6 and 7 show a range of lateral and pivotal movements of bracket 70 relative to the frame as well as the range of adjustment for the vertical position of the track relative to the bracket. These adjustments, in association with the front to rear adjustment of the cross member 67 in the slots 65, permit the track C to be precisely adjusted to any one of a large number of positions relative to the carriage B to assure proper location of the welding tool relative to the seam to be welded.

Where adverse weather conditions can be expected the two sides and rear of the skeletal frame of the carriage B as well as the top of the frame and canopy assembly 60 may be covered with canvas or other suitable material. Where the tool operator must work in the hot sun only the canopy assembly 60 and frame would normally be covered.

OPERATION

In the operation of the welding tool carriage B shown and described, wall sections 10 are first located end-to-end abutment to form the vertical seams 11 to be welded. Normally these seams are initially determined by the seaming of the wall sections in place by tack welding or other known means. The carriage B is then mounted on the wall sections adjacent the sides to be welded by placing the rollers 33 along the top edge thereof and causing rollers 54 to bear along the desired side of the wall, thus positioning the carriage B in cantilevered position along the wall. Normally the height of the platform 30 is first adjusted to fit the circumstances.

If the welding tool has not already been attached to the carriage, an operator then stands on the platform and receives the welding tool and accessory equipment from below. He connects the track C of the automatic welding tool to the bracket 70 so that the track is susepended for pendular movement from the canopy assembly 60. The cross member 67 may be adjusted from front to rear so that the track is properly located to be positioned on the wall sections. The height of the track relative to the frame may also be adjusted using the slots 74 in the side plates 73. The operator then holds the track C away from the wall and either by himself or with the aid of another operator moves the carriage along the wall until the carriage laterally overlies the seam to be welded. If necessary, the bracket 70 is then moved laterally on member 67 until the tool carried by the track C is located precisely over the seam to be welded. The operator then swings the track C inwardly until it is positioned against the wall adjacent the seam. At this point the operator can initiate the welding operation as desired and the tool will proceed to weld the seam. After the welding operation is completed the operator swings the track C away from the wall and again moves the carriage B along the wall to a proper position for welding another vertical seam, making the final adjustment of bracket 70 if necessary. While the carriage B is particularly adapted to use in connection with the automatic welding of vertical seams, it may also be used by an operator in the manual welding of horizontal seams.

Figure 3:
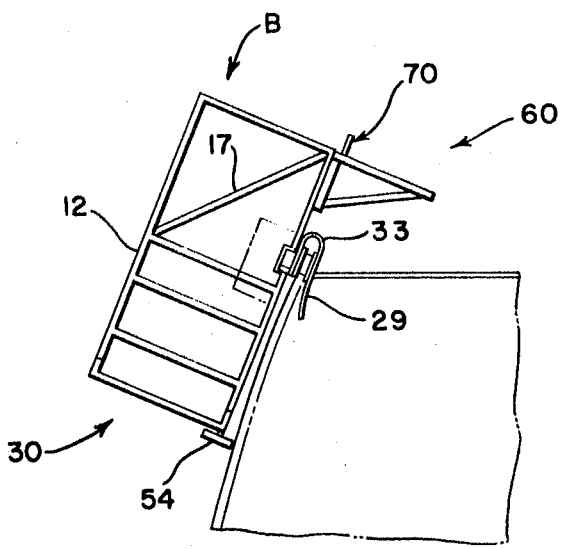
FIGURE 3 is an elevational view showing the welding tool carriage of FIGURES 1 and 2 located in operating position on a spherical or ellipsoidal type storage tank shell shown in broken lines.

As shown in FIGURE 3 the carriage is adaptable to use in connection with the construction of spherical and ellipsoidal type tanks and the like as well as cylindrical tanks.

While only one embodiment of the invention is illustrated and described, it will be understood that variations and modifications may be made in the form and arrangement of the several parts or elements thereof without departing from the spirit of the invention. The invention therefore is not to be limited to the particular structures and mechanisms herein shown and described nor in any manner inconsistent with the extent to which the progress in the art has been advanced by the invention.

I claim:

1. A carriage for positioning and transporting a track for an automatic seam welding tool or the like, comprising:
    a frame,
    roller means associated with said frame and adapted to support said frame for travel on an upright wall and adjacent the top edge thereof, and
    a track supporting bracket pivotally connected to said frame and adapted to support said track for pendular movement toward and away from said wall.

2. A carriage as defined in claim 1 wherein said frame supports a platform for a welding tool operator.

3. A carriage as defined in claim 2 wherein said platform is adjustable generally vertically relative to said frame.

4. A carriage as defined in claim 1 including means for adjusting the position of said bracket on said frame in a direction substantially normal to said wall.

5. A carriage as defiend in claim 1 including means for adjusting the position of said bracket on said frame in a direction generally perpendicular to a line substantially normal to said wall.

6. A carriage as defined in claim 1 wherein said roller means comprises a pair of rollers with spaced upright axes, adapted to bear against and roll along said wall; and another pair of rollers with spaced lateral axes, adapted to bear against and roll along the top edge of said wall.

7. A carriage as defined in claim 6 wherein said pair of lateral-axis rollers have their axes mounted to pivot about spaced upright axes to accommodate curvature of said wall.

8. In combination, a track for automatic seam welding tools and the like and a carriage for positioning and transporting said track, said carriage comprising:
    a frame,
    roller means associated with said frame and adapted to support said frame for travel on an upright wall and adjacent the top edge thereof, and
    a track supporting bracket pivotally connected to said frame and adapted to support said track for pendular movement toward and away from said wall.

9. A carriage for positioning and transporting the track for automatic seam welding tools and the like, comprising:
    a frame,
    a platform supported by said frame,
    a pair of rollers with spaced lateral axes, mounted on said frame and adapted to bear against and roll along the top edge of an upright wall,
    a pair of rollers with spaced upright axes, mounted on said frame below said lateral-axis rollers and adapted to bear against and roll along said wall,
    said pair of rollers being adapted to support said frame in cantilevered relation on said wall adjacent the top edge thereof, and
    a track-supporting bracket pivotally connected to said frame and adapted to support said track for pendular movement into and out of engagement with said wall, said bracket being adjustable on said frame in a direction normal to said wall and in a direction generally perpendicular to a line normal to said wall.

References Cited

UNITED STATES PATENTS

| | | | |
|---|---|---|---|
| 3,255,944 | 6/1966 | Yadron | 219—126 |
| 2,960,053 | 11/1960 | Meyer | 219—126 |
| 2,805,321 | 9/1957 | Cadwell | 219—126 |
| 2,761,954 | 9/1950 | Westfall | 219—126 |
| 2,866,078 | 12/1958 | Ballentine | 219—126 |

RICHARD H. EANES, JR., Primary Examiner

U.S. Cl. X.R.

219—126